United States Patent [19] [11] 4,156,340
Colgan et al. [45] May 29, 1979

[54] HARVESTER REEL TINE-ORIENTATION CONTROL

[75] Inventors: David L. Colgan; E. Louis Scheidenhelm; Thomas G. Truckenbrod, all of Mendota, Ill.

[73] Assignee: Hart-Carter Company, Minneapolis, Minn.

[21] Appl. No.: 833,455

[22] Filed: Sep. 15, 1977

Related U.S. Application Data

[63] Continuation-in-part of Ser. No. 690,384, May 27, 1976, abandoned.

[51] Int. Cl.² ............................................ A01D 57/02
[52] U.S. Cl. ........................................ 56/227; 56/226
[58] Field of Search ................................ 56/226, 227

[56] References Cited
U.S. PATENT DOCUMENTS 2,212,878  8/1940  Hume et al. ........................... 56/226
2,497,729  2/1950  Heth et al. ............................. 56/226
3,546,863  12/1970  Connolly ............................... 56/226

FOREIGN PATENT DOCUMENTS 751779  7/1956  United Kingdom ..................... 56/226

Primary Examiner—Louis G. Mancene
Assistant Examiner—Paul J. Hirsch
Attorney, Agent, or Firm—Rummler & Snow

[57] ABSTRACT

A controller for maintaining pick-up tines on harvesting reels at predetermined orientation in space as the reel is rotated for severing crops from the ground having inherent structural self-compensation for wear and dimensional tolerance stack-up in the assembly of parts thereof and induced reduction of peak loads thereon by means of a pendulously-suspended control spider which is pivotally mounted on the machine in the direction against and nominally on the line of action of the applied load on said spider from the gathering and cutting of crops by the pick-up reel of said machine.

7 Claims, 5 Drawing Figures

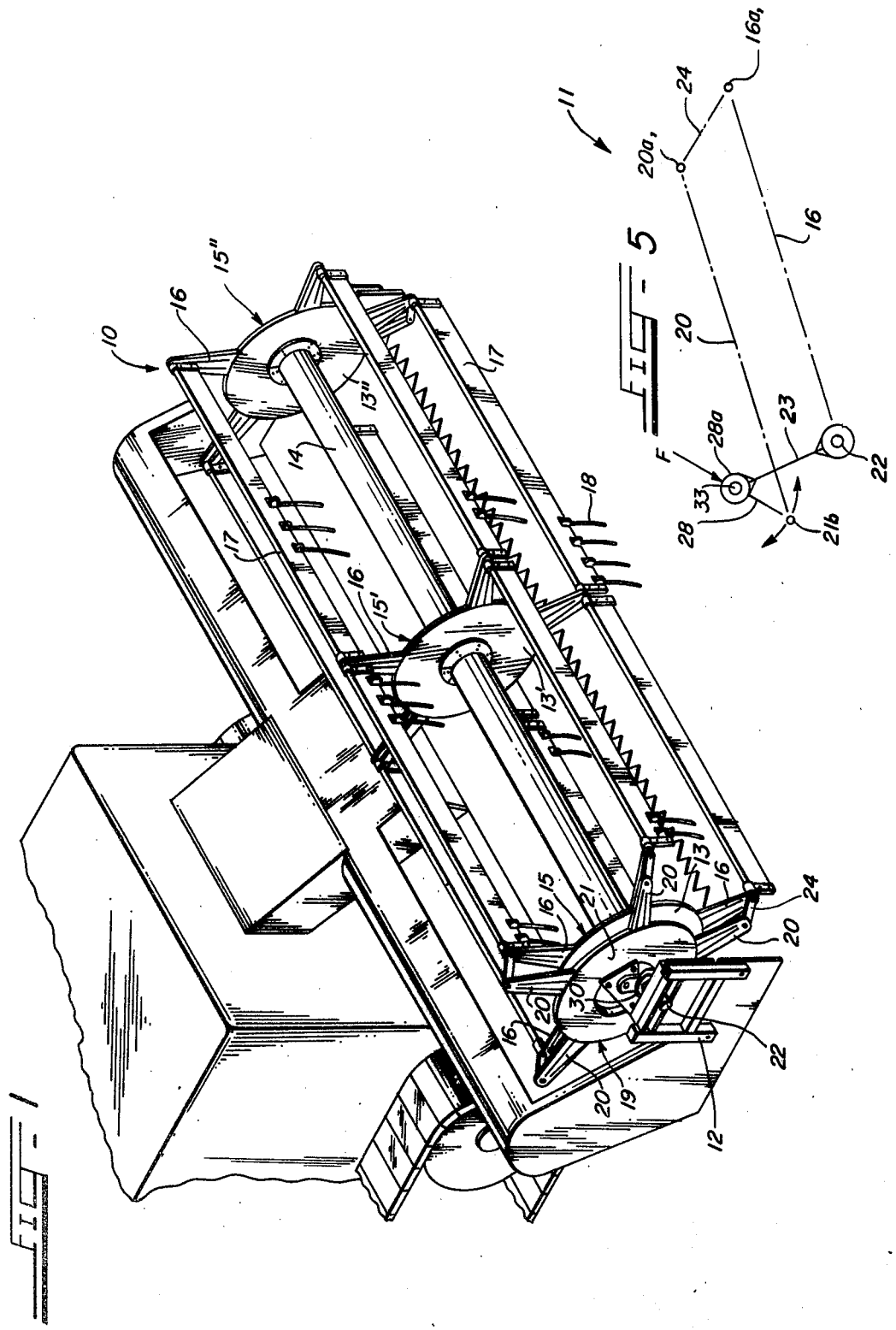

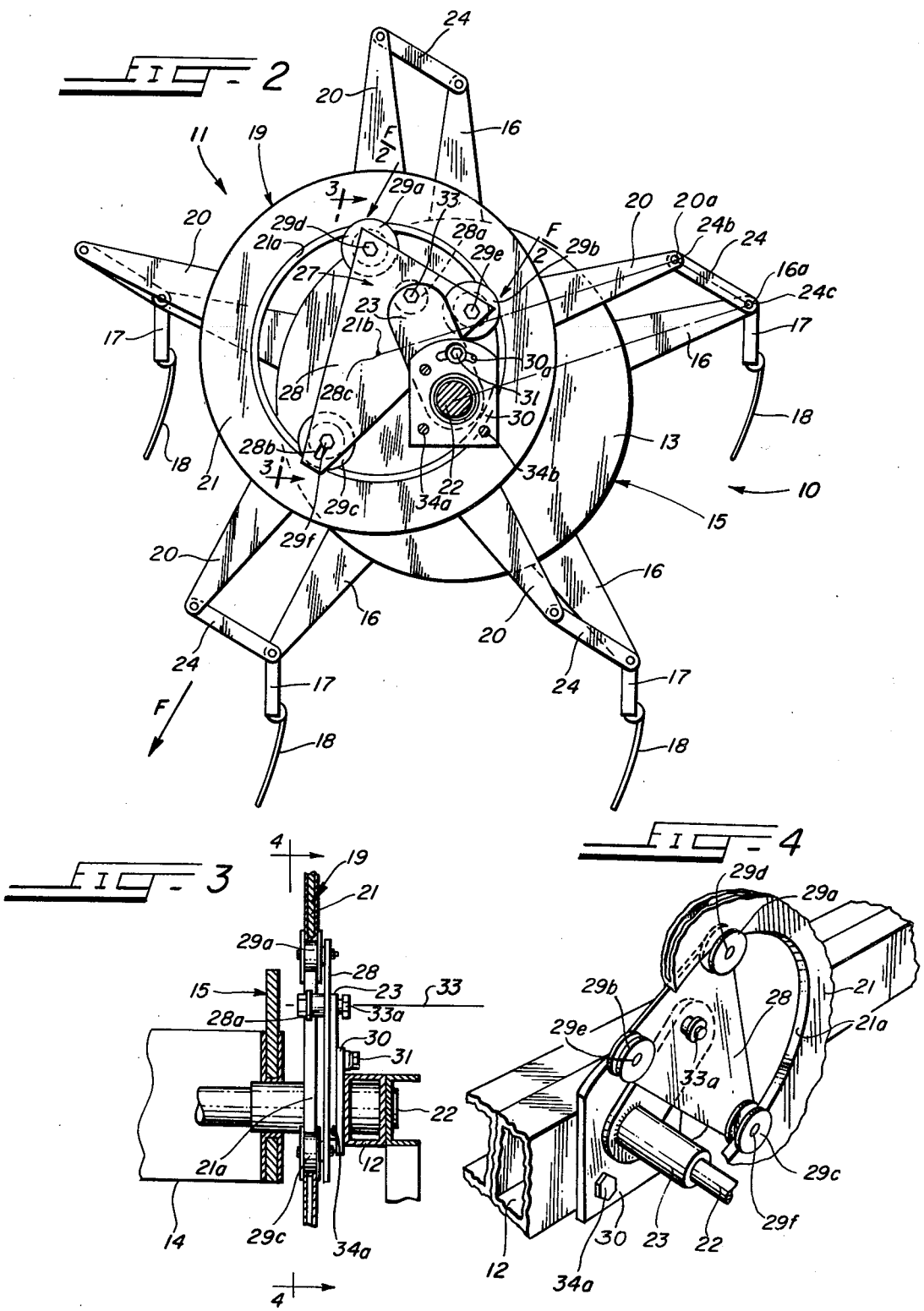

4,156,340

HARVESTER REEL TINE-ORIENTATION CONTROL

This application is a continuation in part of Ser. No. 690,384 filed May 27, 1976 now abandoned.

BACKGROUND OF THE INVENTION

This invention relates in general to eccentric-spider tine-orientation control assemblies for reel-type harvesting machinery having a pick-up reel which rotates about a horizontal axis and which, as the machine moves through a field of grain, grasses or other similar crops, is rotatably driven to gather the crop and feed it to a cutter bar for severing the crop from the stubble at ground level.

The operation of prior art eccentric tine-orientation control assemblies for maintaining pick-up tine at predetermined orientation as the reel rotates is based on the kinematics of the parallelogram four-bar linkage wherein opposite links of each pair of links of the linkage are of equal length. The basic difficulty in the application of the parallelogram four-bar linkage to the design of prior art tyne-orientation control assemblies for harvesters lies in the undesirability from a manufacturing standpoint of having to match selectively four-bar linkage assembly links having differing manufacturing dimensional tolerances such as are necessary to make the part on an economical basis. Unless comprised of selectively matched or loosely assembled links when the four-bar linkage passes through top and bottom center configurations, the tolerance build-up in one pair of links as pinned in straightline end-to-end configuration fights the tolerance build-up in the other pair of links also pinned end-to-end in like straightline configuration and assembled thereto. As a result, very high locked-up loads are generated in the pin joints of the parallelogram four-bar linkage. Such loads are conducive to high wear on the pin joints and shortening of life of the same.

Attempts to relieve these locked-up loads by adding an additional link to the parallelogram-type four-bar linkage tine-orientation control assembly have in the past been thwarted because the five-bar linkage so produced is a kinematically unstable configuration.

There is thus an established need for a stable tine orientation control assembly for a harvester reel which has lower peak loads and less sensitivity to dimensional tolerance stack-up in the assembly of working parts thereof for reducing the wear thereon and increasing the life of the bearings and casting ring races incorporated therein.

SUMMARY OF THE INVENTION

The gist of this invention lies in a modified conventional tyne-orientation control mechanism for harvesting reels having a control spider which is pendulously suspended from a pivot which is fixed to the frame of the machine in the direction against and nominally on the line of action of the applied load thereon, and which spider is loaded by the pick-up reel as it is rotatably driven to sever the crop from the stubble and passes over the ground; wherein changes in dimensions of the control mechanism, due to deviations from the nominal condition resulting from cumulative manufacturing dimensional tolerances and/or wear on assembled parts, are compensated for by inherent self-adjustment within the structural configuration itself in a manner which is kinematically stable and results in lower peak loads thereon.

DESCRIPTION OF THE DRAWINGS

FIG. 1 is a fragmentary perspective view of a pick-up reel rotatably supported on the forward end of a vehicle operative to move the reel through a crop to be harvested having the stabilized, self-compensating tine-orientation control assembly;

FIG. 2 is an enlarged view of the stabilized, selfcompensating tine-orientation control assembly;

FIG. 3 is a fragmentary cross-section view taken along line 3—3 of FIG. 2;

FIG. 4 is a fragmentary enlarged perspective view taken along line 4—4 of FIG. 3; and FIG. 5 is a schematic link centerline diagram of the five-bar linkage resulting from the modification of the four-bar linkage tine-orientation control assembly.

DESCRIPTION OF THE PREFERRED EMBODIMENT

Referring to the pick-up reel assembly 10, as shown in FIG. 1, a longitudinal tubular axis 14 with stub shaft 22 extending from the end thereof rotatably mounts on a harvester frame 12 and mounts pick-up spiders 15, 15' and 15" on separate hubs 13, 13' and 13" on axle 14 in mutually equal-spaced relation therealong. Each pick-up spider 15, 15' and 15" comprises five equal-angularly-spaced, radially-extending arms 16. Ten bat assemblies 17 extend longitudinally between adjacent pick-up spiders 15, 15' and 15" and the arm 16 thereof, respectively, and each assembly 17 pivotally mounts on the outer ends of each arm 16 on identical pitch circles which are centered in concentric relation with the center of tubular axle 14. A plurality of axially-spaced pick-up tine 18 depend from each bat assembly 17 between adjacent spiders 15, 15' and 15".

A tyne-orientation control assembly 11, as shown in FIG. 2, for cooperating with the pick-up reel 10 in the control of the orientation of tine 18 thereon, comprises a control spider 19 which includes a hub 21 having an internal roller bearing race 21a and five equal-angularly-spaced and radially extending arms 20 all lying in a vertical plane which is perpendicular to axle 14. Control spider 19 is laterally spaced from and in vertical parallel relation with adjacent face of the hub 13 and the arms 16 of end pick-up spider 15 on reel 10. Control spider 19 rotates in the vertical plane about actual center 21b which is the true center of bearing race 21a, and which shifts relative to nominal center 28c of bearing race 21a as the eccentricity of said control spider 19 is set relative to the center of stub shaft 22 to vertically align the tine 18 for the harvesting operation. Each of five pin-ended, equal-length drag-links 24 fixedly mount at one end in set angular relation to each of ten bat assemblies 17 carrying tine 18 and pivotally mount on each of the five outer ends of each arm 16 of pick-up spider 15 on a pitch circle which is centered in concentric relation with the axis of tubular axle 14; and each drag-link 24 pivotally mounts at the other end thereof to each of the five outer ends of each arm 20 of tine-orientation control spider 19 on a pitch circle which is centered in concentric relation with the actual center 21b of control spider 19, and which has the same diameter as that pitch circle of the pivots at the outer ends of each arm 16 of the pick-up spiders 15, 15' and 15".

A pendulous link sub-assembly 27, which is part of the control assembly 11, comprises an adjustment plate 30 which bolts to the harvester frame 12 by means of bolts 34a and 34b, as shown in FIGS. 2 and 3, having an arcuate angularity adjuster slot 30a for angular positioning of the eccentricity of the control spider 19 with respect to the pick-up spiders 15, 15' and 15" about the center of stub shaft 22 on tubular axle 14. Eccentric pivot frame of bearing tube and pivot frame 23 arcuately pivots in coaxial relation with respect to the stub shaft 22 and bears an adjustable set angular relation about the center of stub shaft 22 by means of the angularity adjuster slot 30a in adjustment plate 30. A threaded bore 25 (not shown) in pivot frame of pivot frame and bearing tube 23 radially matches the angular adjuster slot 30a in plate 30 and threadedly engages an adjustment clamping bolt 31 therethrough for setting the desired eccentricity of control spider 19 relative to pick-up spider 15.

A pendulous link and pivotal bearing frame 28 swings in pivotal shifting relation with respect to and under the pivot frame of pivot frame and bearing tube 23 in an arc about a pendulous center 33, as shown in FIGS. 2, 3 and 4. Center 33 lies on the line of action of the resultant applied load F on the control spider 19 from the pick-up reel 10 as it severs and gathers crops, as shown in FIG. 2. A sleeve 28a fixedly mounts to the back side of pivotal bearing frame 28 having a bushing 35 (not shown) concentrically located therein which establishes the center 33 of the arc through which pivotal bearing frame 28 pendulously shifts, as shown in FIG. 4. A first smooth bore 23a (not shown) in the pivot frame of bearing tube and pivot frame 23 matches in assembled position theron the center of sleeve 28a in pendulous link and pivotal bearing frame 28. A throughbolt 33a pivotally engages the smooth bore 23a in concentric alignment with the smooth bore 23a in sleeve 28a in assembled relation about center 33, as shown in FIG. 3.

Eccentric bearing rollers 29a and 29b and guide roller 29c each have identical outside diameters and each operatively mounts in the plane of the bearing race 21a on center through-bolts 29d, 29e and 29f, respectively. Each bolt 29d, 29e and 29f fixedly mounts on the pendulous link and pivotal bearing frame 28 on a pitch circle having as center the actual center 21b of bearing race 21a, as shown in FIG. 2, which is nominally in concentric relation with the nominal center 28c of the same but varies therefrom as the pendulous link and pivotal bearing frame 28 swings about pendulous center 33. Eccentric bearing rollers 29a, 29b and 29c are of such a diameter that the outer races of each of the rollers 29a, 29b and 29c under load from the pick-up reel 10 contact with the inner race of bearing 21a with a stress which does not exceed the allowable on the material of said rollers. Actual center 21b on pendulous link and pivotal bearing frame 28 suspends from pendulous center 33 on pivot frame and bearing tube 23 in the direction of the applied load F, as shown in FIG. 2.

Eccentric bearing rollers 29a and 29b each straddle-mount to each side of the line of action of the applied load F which passes through the center 33 on pivot frame 23 thereby loading each roller 29a and 29b nominally equally, as shown in FIG. 2. Guide roller 29c having center throughbolt 29f mounted in slot 28b in pivotal bearing frame 28 lies on a radial line extending through pendulous center 33 and actual center 21b of bearing race 21a on the side of actual center 21b opposite that of center 33 and provides matching adjustment of the diameter of the pitch circles on which center bolts 29d, 29e and 29f of rollers 29a, 29b and 29c mount so as to have concentricity of the contact points on the outer races of rollers 29a, 29b and 29c with internal roller bearing race 21a.

In the operation of the tine-orientation controller assembly 11 as a five-bar linkage. FIG. 5 shows arm 16 which is part of pick-up spider 15 pin-connecting to shaft 22 at one end thereof and having end pin 16a at the other end thereof; and arm 20, which is part of control spider 19 and equal in length and nominally parallel to arm 16, pin-connecting to actual center 21b at one end thereof and having end pin 20a at the other end thereof. Pin 21b lies outside of pin 22 of the parallelogram formed by links 16 and 20 and the drag link 24 and the eccentricity between pin 21b and pin 22, respectively. Link 24 connects to end pin 20a at one end thereof and to end pin 16a at the other end. Shaft 22 lies nominally spaced from actual center 21b by the eccentricity desired and the end pin 20a is spaced from end pin 16a on link 24 by the same distance. Pivotal bearing frame 28 connects actual center 21b at one end thereof with pendulous center 33 at the other end thereof. Center 33 on pivotal bearing frame 28 pivotally mounts in eccentric pivot frame 23 in adjustable angular relation with respect to and about the center of shaft 22. In the nominal configuration, the load F on the tine-orientation control spider 19 from the pick-up spider 15 lies in the direction that actual center 21b on pivotal bearing frame 28 lies with relation to center 33 and passes through those centers.

As the arm 16 of the pick-up spider 15 rotates in the clockwise direction about shaft 22, the links 24 drag arms 20 of control spider 19 about center 21b. Actual center 21b arcuately moves about center 33 as deviations from the nominal center 28c occur and is constrained to always swing toward the nominal center 28c by the stabilizing action of load F which is applied to the arms 20 of the tine-orientation control spider 19 by pick-up spider 15 acting through the drag-links 24.

Reference to FIG. 5 shows the dimensional tolerance build-up in the assembly of arms 16, links 24 and arms 20 is self-compensated for by freedom of movement of actual center 21b on frame 28 in the direction perpendicular to the direction of load F allowing actual center 21b thereon to shift along an arc about center 33 relative to nominal center 28c on pivotal bearing frame 28 as the cumulative tolerance build-up may be plus or minus in dimension relative to the nominal dimension.

It will be understood that details of the construction shown may be altered or omitted without departing from the spirit of the invention as defined by the following claims.

We claim:

1. A harvester reel having control and pick-up reel spiders in a parallel plane of action therewith for reception of a cutting load transmitted from the pick-up reel to the control spider comprising a five-bar linkage having a first link 28 including a pin 33 at one end and a pin 21b at the other end thereof; a second link 23 including a pin 22 at one end and pinned at the other end to pin 33; a third link 16 including a pin 16a at one end and pinned at the other end to a pin 22; a fourth link 24 including a pin 20a at one end and pinned at the other end to pin 16a in nominally parallel relation to a line through pin 21b and pin 22; a fifth link 20 pinned at one end to pin 21b and at the other end to pin 20a in nominal parallel relation to link 16; said links 16 and 20 each lying in one of said parallel planes, respectively, and said links 24 connecting therebetween with the respective pin axes perpendicular thereto; whereby the cutting load has a line of action nominally intersecting the axes of and passing through said pins 33 and 21b in a direction toward and at right angles with said line through pins 21b and 22.

2. In a tine-orientation controller for harvesting reels mounted on a frame wherein there are dimensional changes due to wear and tolerance build-up upon assembly of the controller; having a pick-up reel spider rotationally mounted on said frame cooperating with a control spider having the same pitch diameter as and a center in eccentric relation with respect to the center of said pick-up spider rotationally mounted on said frame; a plurality of drag-links operationally-connecting said pick-up and said control spiders having the same length as and extending in the same direction of said eccentricity for transmitting a cutting load from said pick-up reel spider to said control spider, said cutting load having a predetermined line of action relative to said frame nominally passing through the center of the control spider and directed to intersect at right angles with a line through the centers of the control spider and of the pick-up reel spider, outside of the center of said pick-up reel spider; the combination comprising a means for shifting said control spider center against the direction of the line of action of said load as the center of said control spider shifts in a direction nominally perpendicular to and from the line of action of said load.

3. In the tine-orientation controller for harvesting reels as set forth in claim 2 wherein the control spider center shifting means comprises:
  (a) a bearing frame pivot means 30 mounted on said harvester frame;
  (b) a bearing frame 28 having pendulous center 33 pivotally mounted on said bearing frame pivot means 30 lying on the line of action of the load F on the control spider from said pick-up spider relative to actual center 21b of said control spider in the direction against said line of action of said load F;
  (c) a bearing race 21a mounted on said control spider in concentric relation with said actual center 21b thereof; and
  (d) rollers 29a and 29b engaging said bearing race 21a and fixedly-mounted on said bearing frame 28, one roller 29d lying on one side of the line of action of said load F and the other roller 29e lying on the other side of the line of action of said load F and each lying equi-distant therefrom and both lying on said bearing frame 28 relative to pendulous center 33 in the direction against said line of action of said load F.

4. In the tine-orientation controller for harvesting reels as set forth in claim 3 wherein the eccentric bearing frame pivot means 30 comprises:
  (a) an eccentric adjustment plate mounted to the frame of said machine having an arcuate adjustment slot therein centered on the center of the pick-up reel on said machine; and
  (b) an eccentric pivot frame having one end pivotally mounted about the center of the pick-up reel on said machine and a clamping bolt threaded therein for engaging the arcuate adjustment slot in said eccentric adjustment plate and clamping the eccentric pivot frame to the eccentric adjustment plate.

5. In the tine-orientation controller as set forth in claim 3, the improvement in control spider center shifting means comprising a guide bearing roller 29c engaging said bearing race 21a and fixedly mounted on said bearing frame 28 on said line of action of said load F and lying thereon relative to said center 21b on said control spider in the direction of said line of action of said load F.

6. In a harvester reel assembly rotatably mounted on a frame having a tubular axle with stub shafts mounted thereon extending from each end thereof, a plurality of pick-up spiders mounted in equal-spaced relation along said axle wherein each spider comprises five equal-angularly-spaced, radially-extending arms having the same radial length; a tine-orientation control-spider rotatably mounted on said frame in eccentric and adjacent relation to and outside of the pick-up spider at the end of the axle comprising a hub having an internal bearing race and five equal-angularly-spaced radially-extending arms of the same radial length as the arms of the pick-up spiders; drag-links pivotally mounted between the ends of adjacent arms on the end pick-up spider and on the adjacent control-spider; bat assemblies having a plurality of tines mounted therealong fixedly mounted at each end to the drag-links adjacent the end of the pick-up spider; a bearing-frame pivotally mounted within the internal bearing race of the control-spider having two eccentric bearing rollers in rolling contact with said bearing race mounted thereon, said rollers having a straddle-relation with respect to and lying in the direction relative to the center of said bearing race against the line of action of the load on the control-spider by the pick-up spider from the severing of the crops from the stubble; the improvement in tyne-orientation, control-spider, bearing-frame comprising a pendulous-pivot for said bearing-frame mounted on said harvester frame relative to said straddle-mounted bearing rollers on and in the direction against the line of action of said load applied on the control-spider by the pick-up spider.

7. In a harvester reel assembly as set forth in claim 6, the improvement in mounting the tine-orientation control-spider in eccentric relation to said pick-up spiders comprising:
  (a) an eccentricity adjustment plate mounted on said harvester frame having an arcuate adjustment slot therein centered on the axis of said pick-up reel;
  (b) an eccentric pendulous pivot frame having one end pivotally mounted about the center of the axle of said pick-up reel and the other end adjacent to and in slidable contact with the eccentricity adjustment plate for supporting the pendulous pivot for said bearing frame; and
  (c) a clamping means in engagement with said eccentric pendulous pivot frame and said arcuate adjustment slot in said eccentricity adjustment plate;
whereby the eccentric pivot frame is adjustably clamped to the eccentric adjustment plate.

* * * * *